United States Patent [19]

Stein

[11] Patent Number: 5,316,685
[45] Date of Patent: May 31, 1994

[54] METHOD AND APPARATUS FOR SEPARATING SOLIDS FROM LIQUID CONTAINING SAME

[75] Inventor: Peter Stein, Caracas, Venezuela

[73] Assignee: Grana, Inc., New York, N.Y.

[21] Appl. No.: 922,997

[22] Filed: Jul. 30, 1992

[51] Int. Cl.⁵ ............................................. B01D 21/26
[52] U.S. Cl. .................................. 210/787; 210/781; 210/805; 210/380.1; 210/391; 210/396; 210/512.1; 426/489; 494/36
[58] Field of Search ............... 210/780, 781, 784, 787, 210/805, 373, 380.1, 391, 396, 512.1; 426/489; 494/36

[56] References Cited

U.S. PATENT DOCUMENTS

| | | | |
|---|---|---|---|
| 700,112 | 5/1902 | Atwood | 210/372 |
| 1,545,832 | 7/1925 | Hoffbauer | |
| 2,894,634 | 7/1959 | Lepoutre et al. | |
| 2,953,250 | 9/1960 | Jung et al. | |
| 3,491,888 | 1/1970 | Colburn et al. | |
| 3,648,840 | 3/1972 | Bobo | 210/512.1 |
| 3,864,256 | 2/1975 | Hultsch et al. | 210/217 |
| 3,937,397 | 2/1976 | Zitke et al. | |
| 4,008,098 | 2/1977 | Dietzel et al. | |
| 4,017,022 | 4/1977 | Fielder | |
| 4,518,621 | 5/1985 | Alexander | 210/784 |
| 4,652,254 | 3/1977 | Matsumoto | 210/372 |
| 5,182,008 | 1/1993 | Shelstad | 210/360.1 |
| 5,183,568 | 2/1993 | Lescovich | 210/373 |

*Primary Examiner*—Robert A. Dawson
*Assistant Examiner*—David Reifsnyder
*Attorney, Agent, or Firm*—Cooper & Dunham

[57] ABSTRACT

A method and apparatus for separating solids from liquid containing same comprises a cylindrical casing within which a rotor assembly or block having a conicalmesh rotates about a vertical axis with the mesh walls upwardly diverging. A liquid-solid slurry is introduced tangentially to the inside of the mesh at a top inlet. Stationary wiper arms inside the mesh remove the solids from the mesh as it rotates. Fluid pressure inside the mesh, pumping effect of the rotating blades, gravity force on the slurry and particularly tangential pump suction at the bottom of the casing, drive the liquid out through the mesh, while the solid material is expelled vertically downwards through a central outlet opening in the bottom of the mesh.

7 Claims, 3 Drawing Sheets

METHOD AND APPARATUS FOR SEPARATING SOLIDS FROM LIQUID CONTAINING SAME

BACKGROUND OF THE INVENTION

The present invention is directed to a method and apparatus for separating solids, such as solid particles (e.g. seeds) from a liquid containing same.

In the processing of slurries, it is often desired to separate the solid particles or material from the liquid. In the processing of seeds f or example, the seeds may be washed and then the water must be removed. The present invention is directed to novel arrangement for separating the solids from the liquid, particularly in a continuous process in a highly efficient manner and with high throughput.

SUMMARY OF THE INVENTION

In accordance with the present invention a continuously operated separator is provided for liquids and solids wherein a slurry of liquid and solid particles are introduced into a rotary conical screen mesh. Through the operation of radial wiper blades which conform to the inside surface of the rotary conical screen mesh, the solids and liquid are separated as they move downward through the conical mesh, with the liquid squeezed out through and to the outside of the mesh and with the solids leaving the conical mesh screen at an outlet in the bottom. The separated liquid may be returned or recycled and the squeezed-out particles, such as seeds or grains, may be dumped into a collector tank for further processing, such as rinsing or drying.

In particular, according to one aspect of the invention, the invention provides an apparatus for separating solids from liquid in a liquid-solid slurry, comprising a separator comprising a separator mesh means having a frusto-conical shape with upwardly diverging, walls, a top inlet, a bottom outlet, an axis and generally open center, means for rotating the separator generally about its central axis, means for wiping the inside mesh wall of the mesh means during rotation thereof, and means for introducing a liquid-solid slurry into the center of the separator through the top inlet, whereby the slurry will be squeezed to cause liquid to pass through the mesh means and to cause solids to collect and pass through the bottom outlet.

The apparatus preferably includes a casing around said separator, said casing having a generally cylindrical shape and a bottom, for collecting liquid after passing through the mesh means. The mesh means may comprise a mesh screen, or a perforated plate formed into a frusto-conical shape. The means for wiping preferably extends from the inlet top to the outlet bottom and wipes the inside mesh wall on at least two locations along the mesh wall simultaneously, by way of brushes.

Pump means may be provided for introducing the slurry under pressure. After the liquid passes through the mesh means, and is collected, it may be recycled to the source tank containing the slurry.

The separator preferably comprises a plurality of bars spaced around and engaging the exterior of the mesh means, and a plurality of plates on the interior of the mesh means connected through the mesh means each to a different respective bar, to support the mesh means. The separator also preferably comprises a top circumferential ring and a bottom circumferential ring, and a plurality of radial blades connected to the respective top and bottom rings.

The means for rotating comprises an upper support and a lower support each connected respectively to the top and bottom of the separator through respective ball bearing assemblies, which are preferably conic.

The separator may be rotated at a constant speed. The solids in the slurry may be seeds, grains or other particles.

According to another aspect of the invention, the invention provides a method of separating solids from liquid in a liquid-solid slurry, comprising rotating a separator mesh having a frusto-conical shape with upwardly diverging walls generally about its central axis, wiping the inside wall of the separator mesh during rotation, and introducing a liquid-solid slurry into the center of the rotating separator mesh, whereby liquid will pass through the mesh and solids will pass through the bottom of the separator mesh.

The slurry is preferably introduced under pressure. The liquid is preferably collected after passage through the mesh and added to the slurry.

The inside wall is preferably wiped from the top to the bottom of the separator mesh, and is wiped at least two circumferential locations simultaneously.

The separator may be rotated at a constant speed. The solids in the slurry may be seeds, grains or other particles.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENT

Figure 1:
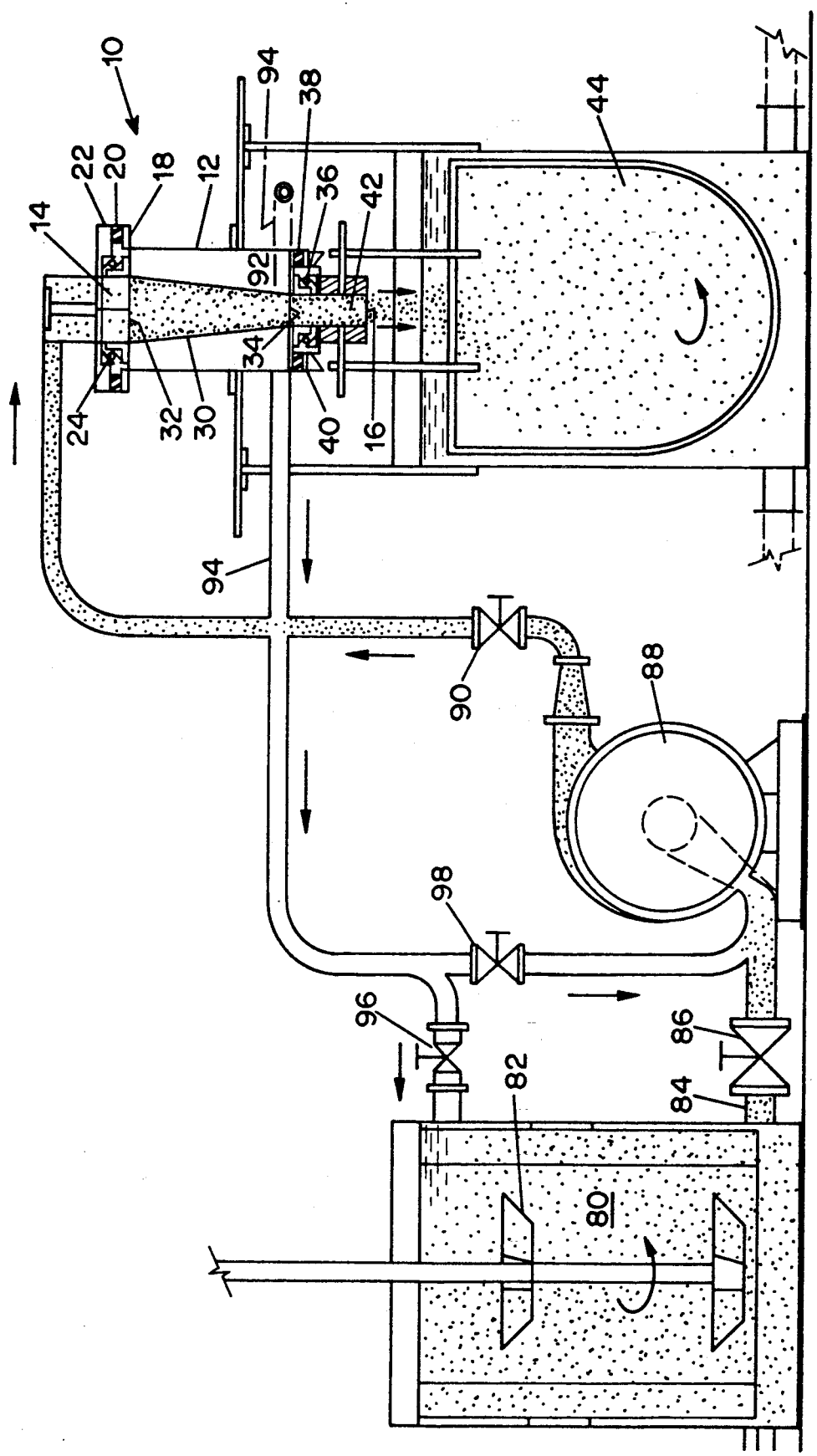
FIG. 1 is an elevational view, in partial cross-section, of a separator system according to the invention.

As shown in FIG. 1, a separator 10 according to the present invention comprises a squeezer body or cylindrical casing 12 having a cylindrical shape but having a top circular opening 14 and a bottom circular opening 16. The casing has an upper peripheral flange 18 upon which rests packing material 20, on top of which is a cover 22, which together protect a top conical bearing 24 from liquids and slurry.

Located for rotational movement inside the casing 12 is a separator element in the form of conical mesh 30 (which is part of a rotating assembly or block), or more aptly a frusto-conical mesh, having upwardly diverging walls, a top inlet opening 32 and a bottom outlet opening 34. The conical mesh is aligned with the top and bottom openings in the casing. The conical mesh 30 is rotatably coupled to the casing at the top by means of the first top conical bearing 24, and at the bottom by means of a second conical bearing 36. A packing 28 and bottom cover 40 provide a means to protect the bottom bearing from slurry, liquids or solids, in a manner similar to a corresponding arrangement for the top bearing. Further means to protect the sealing of the bearing is provided by suction of a suction pump (to be described below) at the discharge outlet.

The apparatus may be operated in a pump mode or a turbine mode. A belt and suitable drive means (not shown in FIG. 1) may provide rotational force in case of pump mode operation to rotate the conical mesh within the casing 12. In case of turbine mode it is the inlet hydraulic energy and the suction of the suction pump that provide the energy for rotation.

At the bottom of the conical mesh 30 is a cylindrical outlet or discharge chute 42, and below the chute is a collector 44, which, as will be described more fully below, collects solid material for rinsing, drying or other processing.

Figure 2:
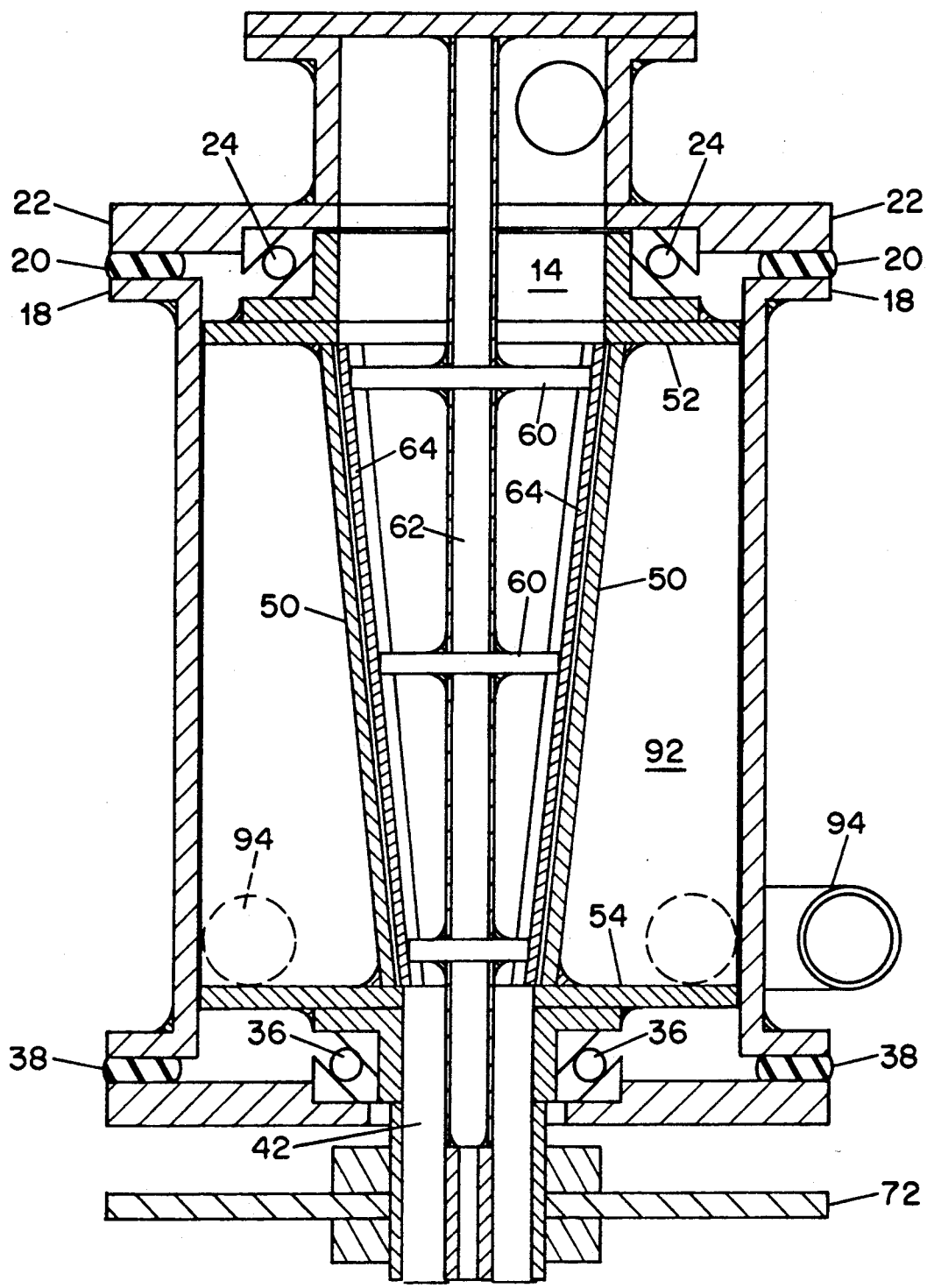
FIG. 2 is an elevational view, in cross-section, of a separator forming part of the system of FIG. 1, showing the separator in more detail.
Figure 3:
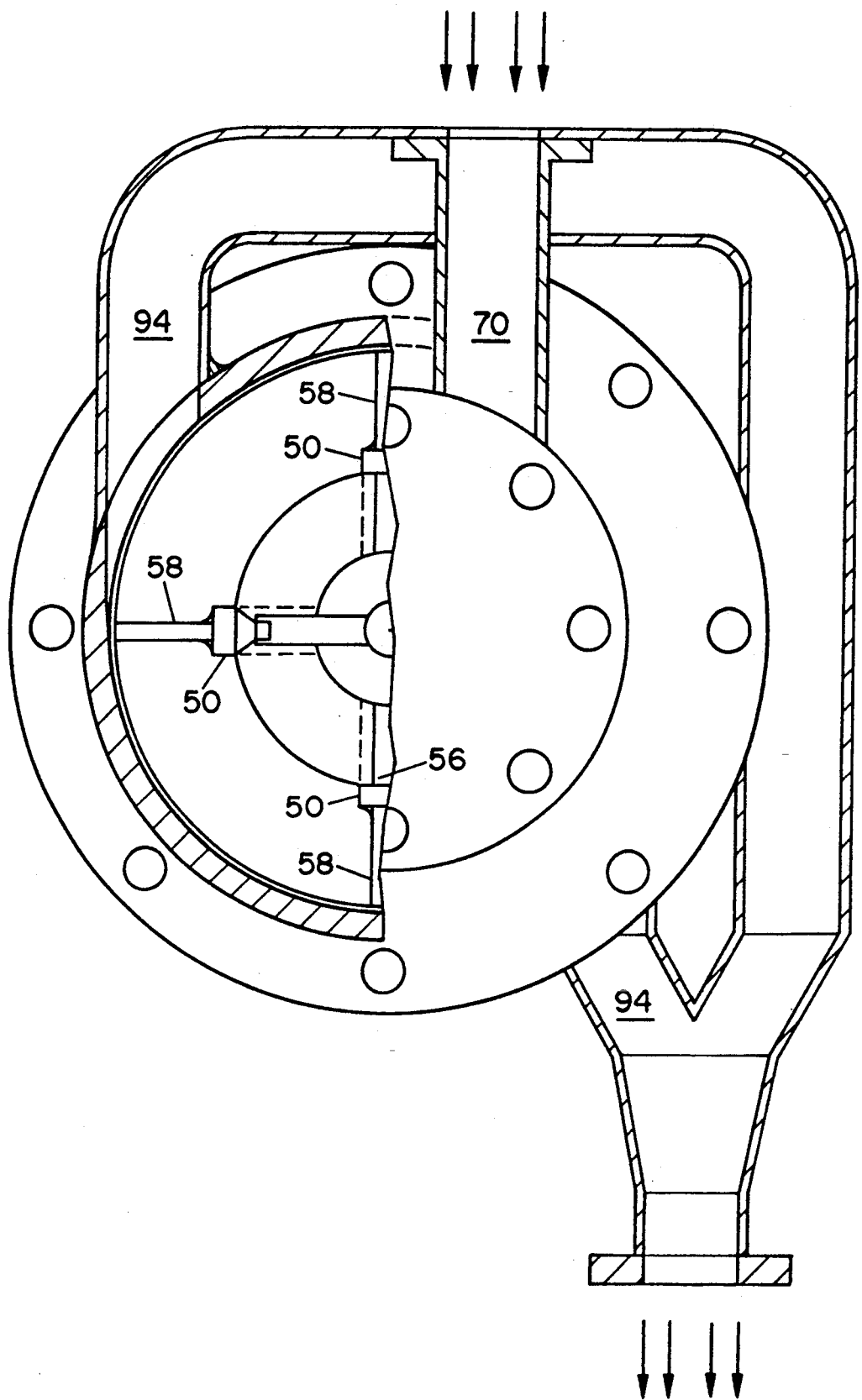
FIG. 3 is a top plan view, in partial cross-section, of the separator of FIG. 2.

The mesh 30 may be made of a metal mesh-like fabric or may be a perforated plate. As shown in FIGS. 2 and 3, to avoid stress concentrations on the mesh, especially if the mesh is fabric or tissue, a support structure is provided, by way of four mesh support bars 50 along the outer conical surface, welded at 90° from each other, to a top disc 52 and bottom disc 54. The mesh is sandwiched between the mesh support bars 50 (which are on the outside of the mesh) and relatively thin mesh pressing plates 56 (which are on the inside of the mesh). The bars 50 and plates 52 are held together by screws. Four radial blades 58 are welded at 90° from each other at four circumferential locations around the casing 12. The blades are connected at their inner radial extent to the bars 50. The preferred material for the mesh is stainless steel, to avoid rusting.

The mesh 30 forms the inner conical boundary and has a mesh clearance size selected in accordance with the size of the solid particles to be squeezed out axially at the bottom outlet of the cone. It may be necessary or desirable to obtain a size-distribution study of the particles of interest to select the best size of the mesh clearance for maximum efficiency. Two or more conical meshes with different mesh clearance sizes may be provided if the particles, and thus the sizes, are not homogeneous.

Stationary wiper arms 60 are provided at 90° spaced apart locations extending radially outwardly from stationary wiper support 62 and have at their outward radial extent wiper brushes 64. Instead of the wiper brushes, a trapezoidal rubber sheet pressed sandwichwise between two static and thin trapezoidal steel plates may be provided, the plates being slightly smaller than the rubber sheet, so that the rubber sheet extends beyond the steel plates and engages the inner conical surface. The wiper brushes, being stationary in relation to the rotating mesh 30, act as a sweeper to remove particle build-up inside the mesh 30 to enable free passage of liquid outwardly. The wiper structure is secured by screws to the top cover, so that the cone mesh rotates outside the stationary wipers and inside the casing. The wipers may also thus be easily removed. The number of blades may be increased (up to 8-12 blades, for example,) in large squeezers. A water/solid particle slurry is injected into the interior of the conical mesh 30 by means of a pipe 70 tangentially welded to the top cover. Rotational force is imparted to the conical mesh 30 to rotate the mesh in the turbine mode of operation by (1) injecting slurry tangentially under pressure, and (2) extracting water tangentially by a suction pump.

For better understanding which parts rotate and which parts are stationary, in FIG. 2, the stationary elements are shown with cross-hatching lines from the upper right to the lower left, and the rotating cone and associated rotating structure is shown with cross-hatching lines from the upper left to the lower right. FIG. 2 at its lower region shows a torque disk 100 which is coupled to a drive means to provide rotational force to rotate the conical mesh, in case of pump operation mode.

Returning now to FIG. 1, a source tank 80 receives a slurry of liquid and solid material and stirs the slurry with a stirrer 82. The slurry leaves the source tank at an outlet 84 through valve 86 and is provided at the inlet of a slurry pump 88. The slurry pump 88 pumps the slurry under pressure through a control valve 90 to the top of the conical mesh where it is driven downward both by gravity and the pressure from the pump 88. The pump 88 thus causes a squeezing pressure differential between the inside of the mesh and outside of the mesh. The pump 88 also provides the inlet hydraulic energy to aid in rotating the conical mesh 30, in the turbine mode of operation. The rotation of the conical mesh 30, aided by the action of the internal wiper arms 60 and brushes 64 wiping the inside walls of the conical mesh, remove the seeds from the mesh surface, allowing the liquid to flow outwardly through and to the exterior of the conical mesh liquid into collection region 92. The solid material is driven downward out of the outlet in the bottom of the conical mesh into the solid particle collector.

The casing in its outer peripheral liquid collection region 92 collects the liquid expelled through the mesh. Two diametrically opposed outlet pipes 94 are connected to the bottom of the casing (such as by welding them tangentially to the casing). The slurry pump 88 provides suction to draw the water out of the outlet pipes 94, which further contributes rotational force to rotate the mesh 30 (which is part of the rotor assembly or block). The suctioned water is provided to the source tank through suction control valve 96, and to the inlet of the slurry pump 88 through the pump inlet control valve 98. Two separate pumps, one for slurry injection and one for liquid extraction, may be used instead of one pump for performing both functions, if the user desires.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of continuously separating solids from liquid in a liquid-solid slurry comprising:
 continuously rotating a separator mesh having a frusto-conical shape having a top and bottom with upwardly diverging mesh walls having inner and outer sides, extending from the top to the bottom, a top inlet, a bottom outlet and a generally open center generally about its central axis, said axis being arranged generally vertically, said mesh having a mesh clearance smaller than the size of the solids;

wiping tangentially the inner side of the mesh wall of the separator mesh during rotation with a stationary wiper; and introducing a liquid-solid slurry into the center of the rotating separator mesh;

creating a squeezing pressure differential between the inside of the mesh and the outside of the mesh by pumping the slurry under pressure into the inside of the mesh and suctioning the liquid out of the outside of the mesh;

whereby the pressure differential will cause rotation of the mesh, which with the wiping action of the inner mesh wall during continuous rotation and the force of gravity on the slurry, will cause liquid to pass through the mesh and solids to pass through the bottom outlet of the separator mesh.

2. The method according to claim 1, wherein the step of introducing a slurry comprises introducing a slurry under pressure.

3. The method according to claim 1, further comprising the step of collecting the liquid after passage through the mesh and providing said liquid to the slurry.

4. The method according to claim 1, wherein the step of wiping comprises wiping the inside wall from the top to the bottom of the separator mesh.

5. The method according to claim 1, wherein the step of wiping comprises wiping the inside wall at at least two circumferentially spaced locations.

6. The method according to claim 1, wherein the step of rotating comprises rotating at a constant speed.

7. The method according to claim 1, wherein the solids in the slurry are seeds.

* * * * *